June 5, 1945.   N. S. REYNOLDS   2,377,452
SEAL CONSTRUCTION
Filed April 19, 1943
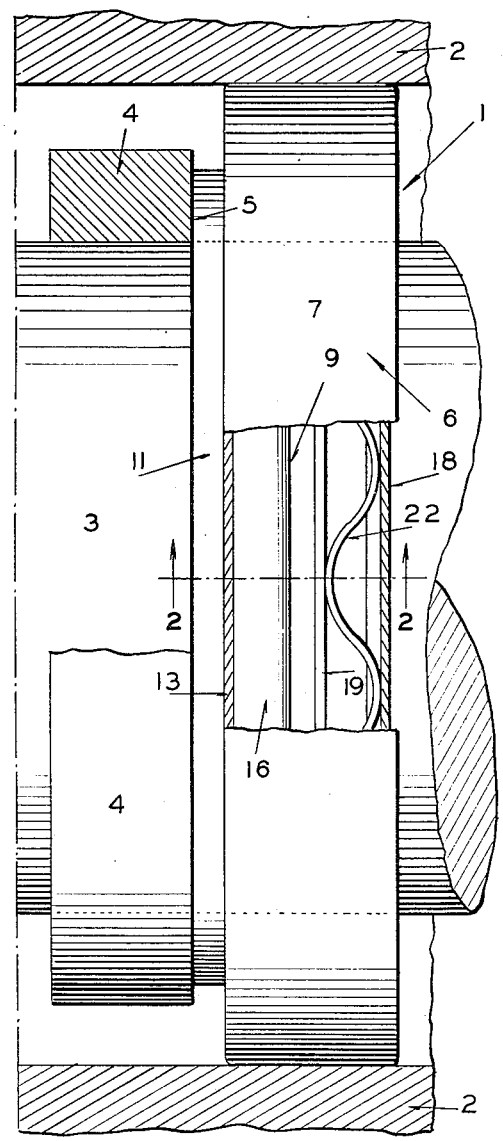
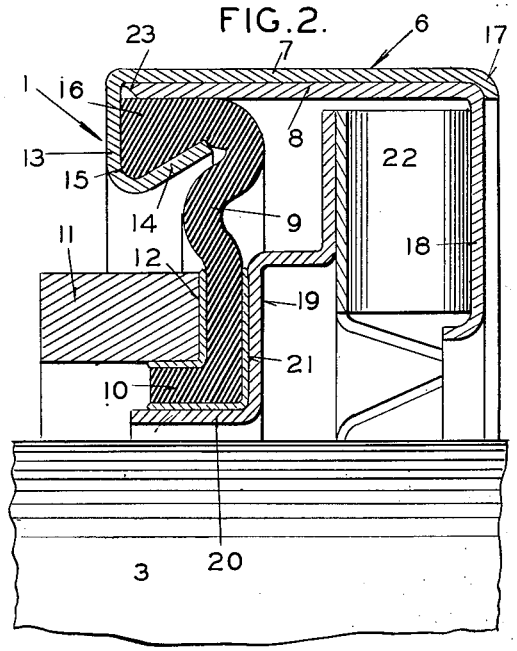
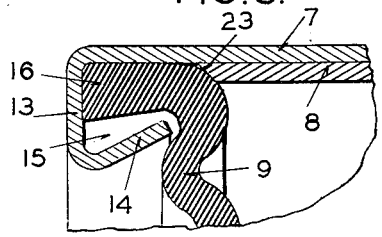
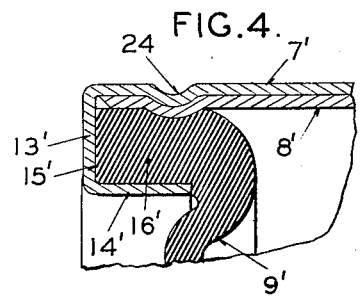
INVENTOR
N. S. REYNOLDS
BY P. H. Lamphere
ATTORNEY Patented June 5, 1945

2,377,452

UNITED STATES PATENT OFFICE 2,377,452

SEAL CONSTRUCTION

Noel S. Reynolds, St. Louis, Mo.

Application April 19, 1943, Serial No. 483,583

6 Claims. (Cl. 286—11)

My invention relates to seals and more particularly to an improved seal construction embodying a flexible diaphragm and a supporting shell.

One of the objects of my invention is to provide improved means in a seal construction for attaching a flexible diaphragm to a supporting shell.

Another object of my invention is to so construct a seal of the type referred to that the diaphragm can be attached to the shell and a spring embodied in the seal in proper operating position by means of a simple assembly method.

Yet another object of my invention is to produce an improved seal of the diaphragm type which will be economical to manufacture and capable of efficient operation for long periods.

Other objects of my invention will become apparent from the following description taken in connection with the accompanying drawing in which Figure 1 is a view of a seal embodying my invention, said seal being shown with parts broken away and operatively associated with a shaft; Figure 2 is a sectional view taken on the line 2—2 of Figure 1 and showing details of the seal construction; Figure 3 is a sectional view showing the relation of certain parts during assembly; and Figure 4 is a sectional view showing a modification.

Referring to the drawing in detail, my improved seal construction is indicated generally by the reference character 1 and is associated with a support 2 and a shaft 3, said shaft carrying a collar 4 having a sealing surface 5 perpendicular to the axis of the shaft. The seal construction comprises an outer shell 6 formed from an outer cylindrical member 7 and an inner cylindrical member 8, said shell being received in the bore of support 2 with a tight fit. The shell has secured thereto a flexible diaphragm 9 which may be made from rubber, synthetic rubber or any other suitable flexible material. The inner portion of this diaphragm has a flange 10 on which is mounted a sealing ring 11 for cooperative sealing engagement with surface 5 of collar 4 on the shaft. The sealing ring may be secured to the diaphragm in any suitable manner as, for example, by means of a cement or adhesive 12, or it may be bonded thereto by the use of some suitable bonding material as, for example, a thermo-setting plastic material. The ring is shown as secured to both flange 10 and the main body of the diaphragm.

The inner end of the outer cylindrical member 7 forming part of the shell is provided with an inwardly extending flange 13 having a rearward extension 14 so related with the wall of the cylindrical member 7 as to provide an annular pocket 15 having a reduced opening. Received in this pocket is the outer peripheral portion 16 of diaphragm 9, said portion being made in order to be thicker than the body of the diaphragm. This portion 16 is held in the pocket under pressure by the inner cylindrical member 8 of the shell as a result of the assembling operation to be described. The inner cylindrical member 8 is held in the outer cylindrical member 7 by the latter having its rear end turned over to form a holding flange 17. The inner cylindrical member 8 of the shell also carries an inwardly extending annular flange 18 at its outer end.

The rear of diaphragm 9 carries an annular backing ring 19 which has a flange 20 overlying flange 10 of diaphragm 9. This flange 20 and the main body of ring 19 is suitably secured to the diaphragm and its flange 10 by any suitable adhesive or cement 21 or it may be bonded thereto if found desirable. The outer portion of ring 19 is spaced from flange 18 of the inner cylindrical member 8 of the shell and interposed between the ring and the flange is an annular corrugated leaf spring 22 acting to press the sealing ring into engagement with the shaft collar.

In assembling the seal construction just described, the sealing ring 11 and backing ring 19 are first secured to the flexible diaphragm 9. The outer peripheral portion 16 of the diaphragm is next placed in the annular pocket formed at the inner end of the outer cylindrical member 7 of the shell by flange 13 and extension 14. The leaf spring 22 is then placed in position against ring 19 and then the inner cylindrical member 8 of the shell is forced into the outer cylindrical member 7 and to a position where the inner end thereof will engage flange 13 of the outer cylindrical member of the shell. The position of the inner and outer cylindrical members and the relation of the peripheral portion of the diaphragm and the pocket just prior to the final telescoping movement of the cylindrical members is shown in Figure 3. As the two cylindrical members are caused to telescope, the inner end of the inner cylindrical member will compress the peripheral portion 16 of the diaphragm and cause it to be confined within the pocket in a smaller space than it occupied prior to assembly of the inner cylindrical member. This compressing of portion 16 of the diaphragm will result in this portion being firmly secured in the annular pocket and prevented from being pulled out due to the formation of an annular portion in the pocket which is larger than the opening of the pocket. In order to facilitate the compressing of portion 16 of the diaphragm into the pocket, the inner end of the inner cylindrical member 8 is beveled as shown at 23. When the inner end of the inner cylindrical member 8 contacts with flange 13 of the outer cylindrical member 7, the rear end of the outer cylindrical member can be turned over to form the holding flange 17. The assembly is now completed. The forcing of the inner cylindrical member 8 into the outer cylindrical member 7 and the forming of the holding flange 17 can all be done with a single operation by a single tool.

From the above description of my improved seal including its method of assembly, it is apparent that the seal can be very economically manufactured and assembled. The sealing ring 11 and the backing ring 19 can be very easily secured to the diaphragm and it is not necessary to disturb these members or cause injury to the sealing ring in any way during the securing of the diaphragm to the shell as no crimping operation of extension 14 is necessary to clamp the outer portion 16 of the diaphragm to the shell as such is all accomplished when the inner cylindrical member 8 is telescoped in the outer cylindrical member. All difficulties in crimping due to lack of available space are also eliminated by my improved construction and method of assembly. My improved method of causing the diaphragm to be compressed and secured in the pocket also results in making the diaphragm more flexible since it is not necessary to deform the extension 14 which would cause pulling on the diaphragm, thereby stretching it, and thus remove some of the flexibility. The compressing of the diaphragm by the cylindrical member 8 decreases the diameter of the diaphragm, thus increasing the flexibility, a very desirable result. The inner cylindrical member is so formed as to provide one abutment for the spring which is assembled in its operative position at the same time that the diaphragm is secured to the shell.

A slightly modified construction is disclosed in Figure 4, especially with respect to the securing of the diaphragm to the outer shell. In this construction the outer cylindrical member 7' is provided with a flange 13' having an extension 16' to form the pocket 15'. The extension 16', instead of being at an acute angle with the cylinder wall, extends substantially parallel therewith. The peripheral portion 16' of diaphragm 9' is of such normal thickness as to just fit in the pocket and when positioned therein and the inner cylindrical member 8' telescoped into the outer cylindrical member, this peripheral portion 16' will be compressed. In order to insure that the outer portion of the diaphragm will be securely held in the pocket, the material of the cylindrical members 7' and 8' is deformed inwardly as indicated at 24. This deformation may be at spaced circumferential points or it may extend completely around the shell. When the structure shown in Figure 4 is employed, the holding flange 17 on the outer cylindrical member may be eliminated if desired.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a seal construction, an outer shell, a flexible diaphragm secured to the outer shell, a sealing ring secured to one side of the diaphragm, a ring secured to the diaphragm on the side opposite the sealing ring and having a portion extending toward the shell and spaced from the diaphragm, an inwardly extending flange carried by the shell and axially spaced from the extending portion of the ring, and a spring interposed between the flange and said ring portion.

2. In a seal construction, a flexible diaphragm carrying a separate sealing ring having a surface lying in a plane at right angles to the axis of the seal, a shell comprising a cylindrical member having an annular pocket at one end opening in an axial direction and receiving a portion of the diaphragm and a second cylindrical member having an inwardly extending flange at one end and being received in the first cylindrical member with its other end portion extending into the pocket between the surface of the first cylindrical member and the portion of the diaphragm in said pocket, and an annular leaf spring abutting the flange of the second cylindrical member and acting to apply an axial force to the diaphragm and the sealing surface carried thereby.

3. In a seal construction, an outer shell, a flexible diaphragm secured to the outer shell, a sealing ring secured to one side of the diaphragm, a ring secured to the diaphragm on the side opposite the sealing ring and having a portion extending toward the shell and spaced from the diaphragm, and a spring applying an axial force to the extending portion.

4. In a seal construction, an outer shell, a flexible diaphragm peripherally secured to the outer shell and having an inner annular flange portion, a sealing ring mounted on the flange and secured to the diaphragm, an annular member secured to the diaphragm on the side opposite the sealing ring and having a flange portion in cooperating overlying relation with the flange portion of the diaphragm, and spring means applying an axial force to the annular member.

5. In a seal construction, an outer shell provided with a pocket at one end opening in an axial direction, a flexible diaphragm having its peripheral portion secured in the pocket of said shell, a sealing ring secured to one side of the diaphragm, a rigid backing member secured to the opposite side of the diaphragm, and a spring interposed between said rigid member and the outer shell for applying an axial force to the sealing ring.

6. In a seal construction, an outer shell provided with a pocket at one end opening in an axial direction and carrying an inwardly extending flange at the other end, a flexible diaphragm having its peripheral portion secured in the pocket of said shell, a sealing ring secured to one side of the diaphragm, a rigid backing member secured to the opposite side of the diaphragm and having a portion extending toward the shell and spaced from the diaphragm, and an annular leaf spring interposed between said rigid member and the flange carried by the outer shell for applying an axial force to the sealing ring.

NOEL S. REYNOLDS.